Patented Nov. 13, 1934

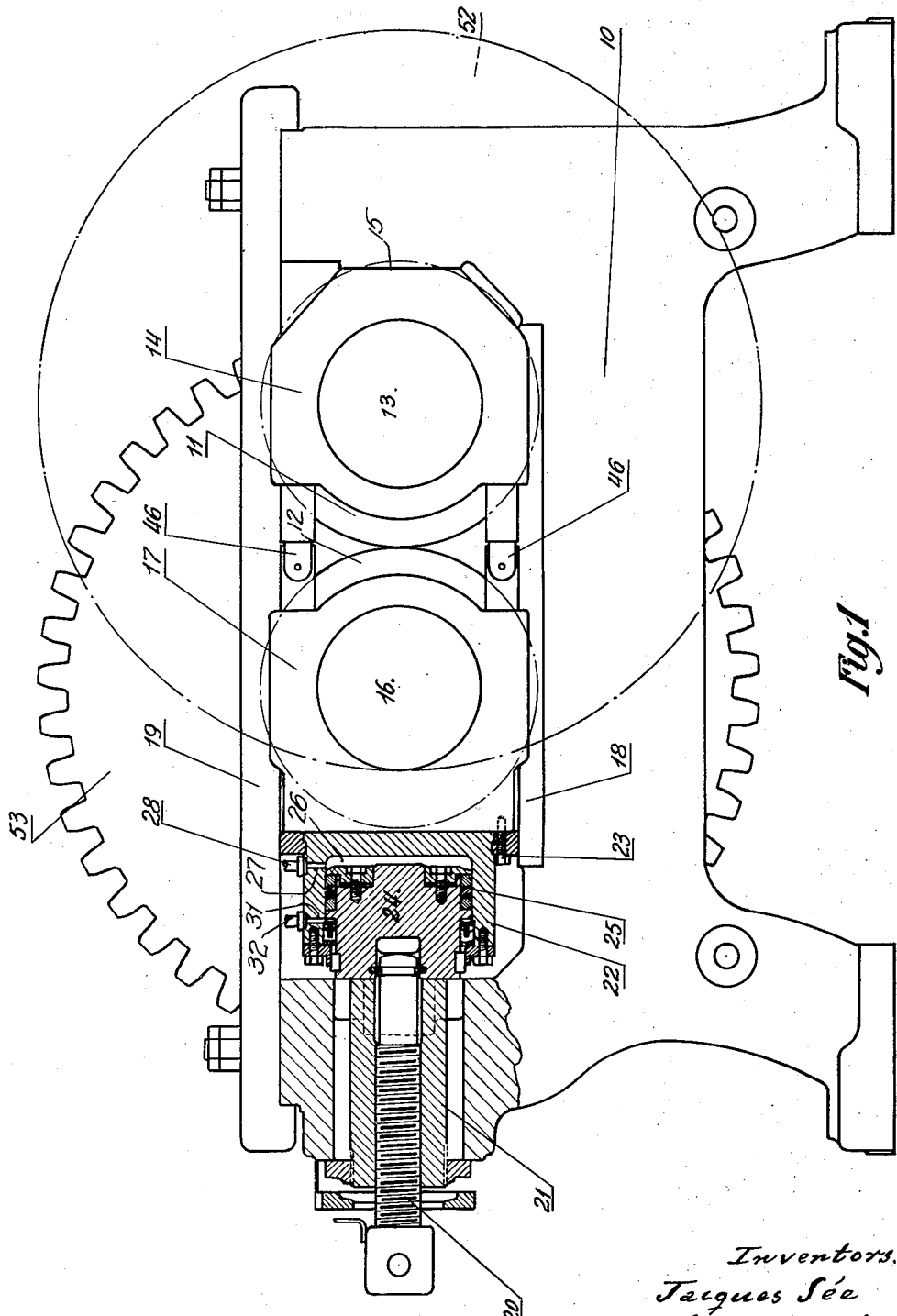

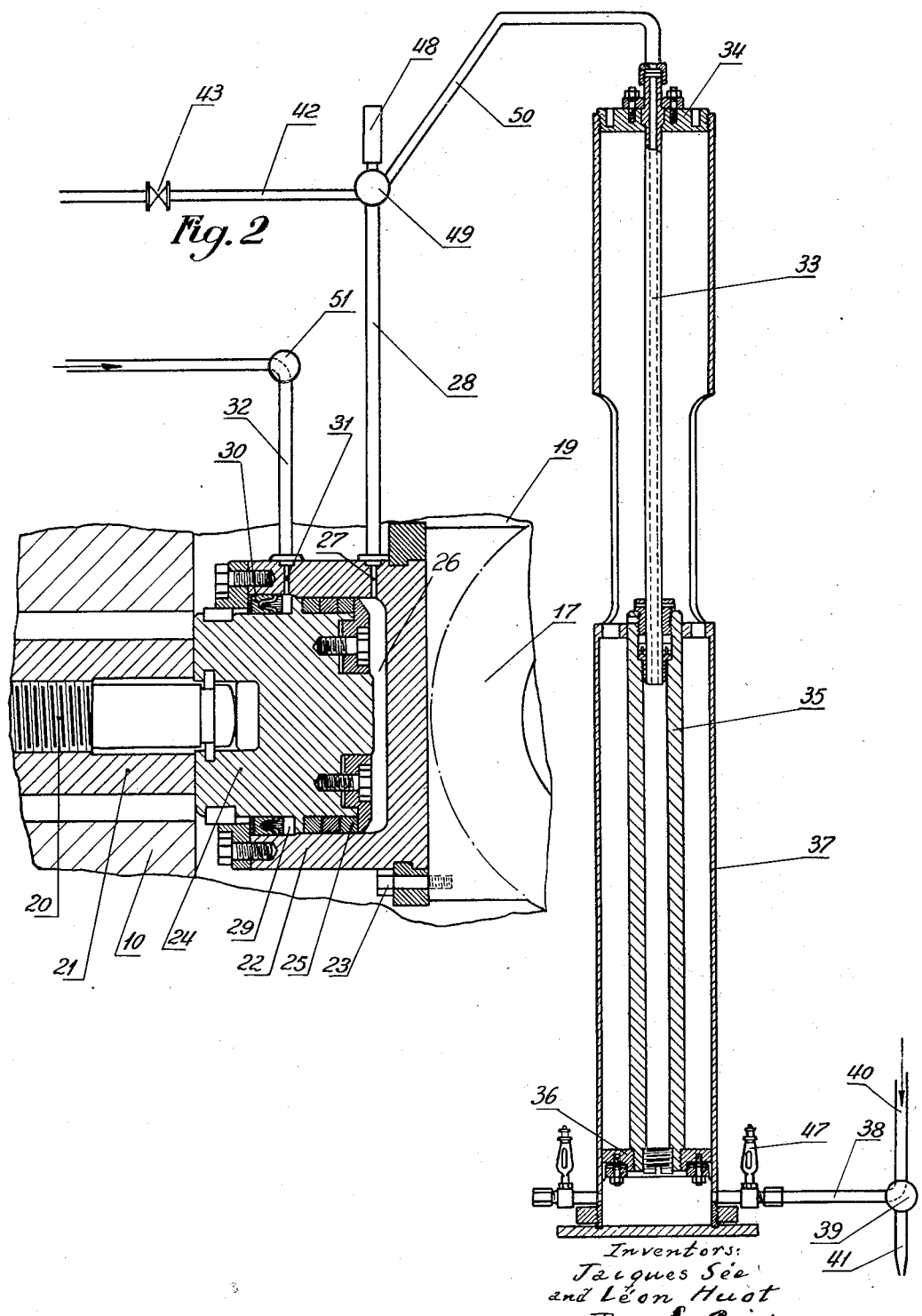

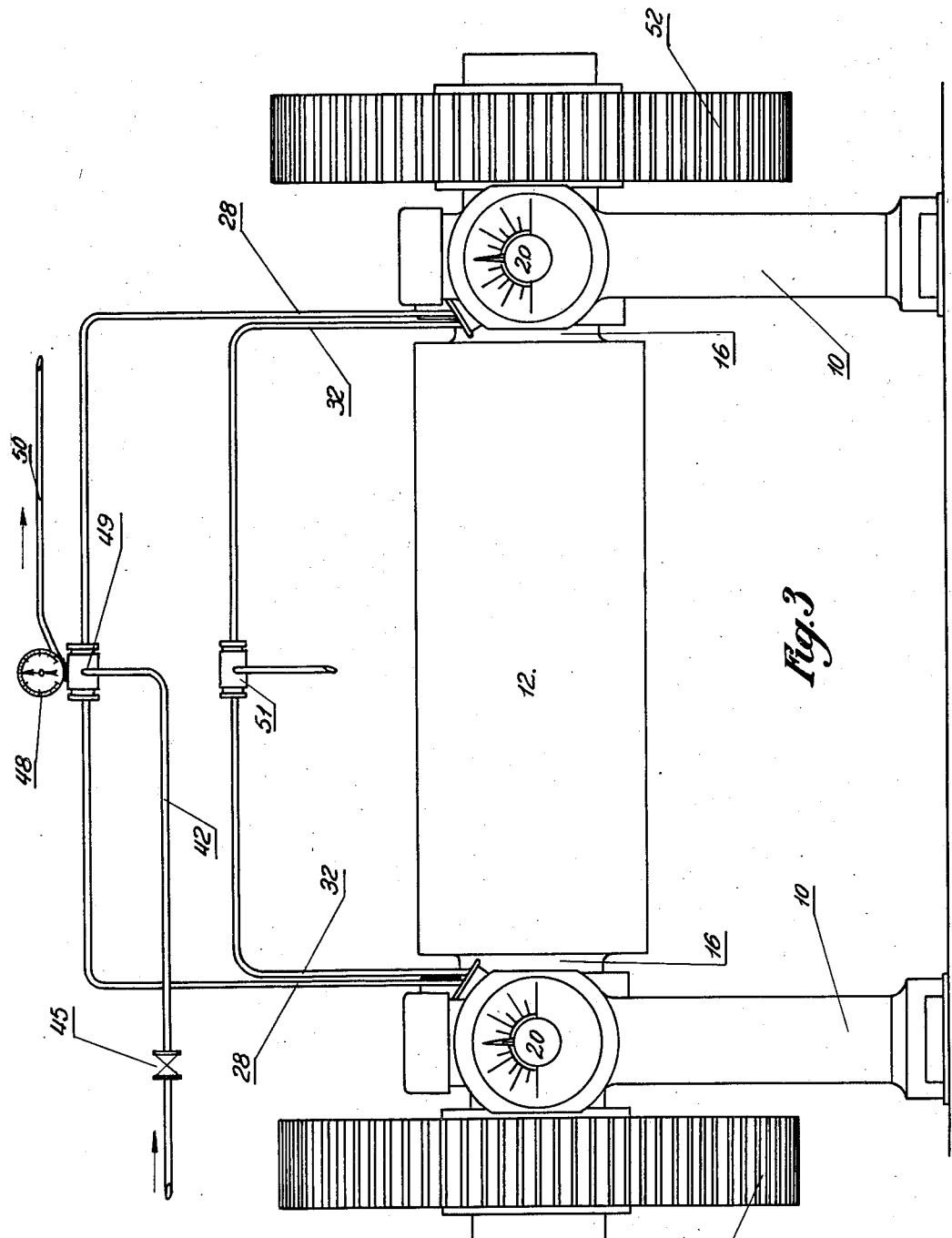

1,980,882

UNITED STATES PATENT OFFICE 1,980,882

HYDRAULIC PRESSURE DEVICE FOR ROLLING MILLS

Jacques Sée and Léon Huot, Paris, France, assignors of one-half to Etablissements Hutchinson, Paris, France, a corporation; and one-half to Le Materiel Special L. M. S., Paris, France, a corporation Application October 1, 1932, Serial No. 635,873
In France October 14, 1931

2 Claims. (Cl. 18—2)

The present invention relates to rolling mills, and chiefly to certain machines of this class adapted for the treatment of india rubber or like yielding material, comprising two rolls between which the material is treated at a great pressure.

One of the said rolls is mounted in bearings which may be displaced towards the other roll, and in the known devices, screws are employed to thus displace the bearings in order to produce the desired pressure.

It has been proposed to replace such screws by hydraulic jacks of the single-acting type, but such devices are not adapted to return the bearings to the rear, while on the other hand, they are a source of abrupt over-pressures which offer prejudice to the preservation of the working parts and to the regularity of the operation.

The present invention obviates all such drawbacks, and for this purpose, double-acting hydraulic jacks are interposed between the usual pressure screws and the bearings said jacks thus comprising an additional chamber of variable volume.

Furthermore, the main chamber of each jack is connected by a slightly flexible conduit with a hydraulic apparatus adapted to increase the pressure, consisting of the combination of two cylinder and piston sets, of unequal diameters, in which the first set, of large diameter, is controlled by an elastic fluid and is adapted to displace the movable part of the second set, whose diameter is much smaller, and which thus produces at will the high pressure required for the operation of the machine.

A constructional form of the hydraulic pressure device in conformity to the invention is shown by way of example in the accompanying drawings.

Fig. 1 is a view of the rolling mill, with certain parts in section. Fig. 2 is a diagrammatic view of the hydraulic pressure device properly so called. Fig. 3 is a front view of the rolling mill, in a simplified form.

The machine represented in Fig. 1 comprises two side-frames 10 supporting two rolls 11 and 12 adapted to treat the material. The roll 11 is driven by a gear-wheel 52 and is mounted by its journals 13 in two bearings 14, in contact at 15 with a fixed part of the frame 10.

The roll 12 is driven by a gear wheel 53 and is mounted by its two journals 16 in bearings 17 which are slidable on the frames 10 upon two smooth surfaces 18—19 formed on said frames.

Hitherto, such bearings 17 were pressed towards the bearings 14 by a pressure screw 20 under manual control and engaged in a block 21 forming a nut and mounted on the frame 10.

In conformity to the invention, between each movable bearing 17 and the corresponding screw 20 is interposed a hydraulic jack comprising a movable cylinder 22 secured to the bearing 17 by screws 23. The cylinder 22 contains a piston 24 provided with packing rings 25. The chamber of the jack having a variable volume is shown at 26, and it communicates by a duct 27 with a slightly flexible conduit 28 supplying a liquid at high pressure, such as several hundreds of kilogrammes per square centimetre.

As shown particularly in Fig. 2, a second chamber of variable volume 29 is situated in the packing rings 25 and between the cylinder 22 and piston 24 of each jack, the chamber being bounded on one side by a pressed leather member 30. The chamber communicates by duct 31 with a conduit 32 controlled by a valve 51 and supplying a fluid under constant pressure and of mean value, such as 30—50 kilogrammes per square centimetre, provided by a low-pressure tank.

As shown in Fig. 2, the high-pressure conduit 28 of each jack leads to a valve 49 connected by a conduit 50 with a hollow rod 33 secured to a cap 34 mounted on a main frame 37; said rod serves as the piston, of relatively small diameter, of a cylinder with thick walls 35 which is secured to a piston 36 of relatively large diameter operating in a cylinder formed in the frame 37, whose lower part communicates with a valve 39 connected by a conduit 40 with a compressor of an elastic fluid at mean pressure, not shown.

The valve 39 further comprises an emptying pipe 41, and the said valve is adapted to close the conduit 38, or to connect it with the conduit 40 or with the pipe 41. On the valve 49 is mounted a conduit 42 for filling with liquid, provided with a cock 43.

The operation of the said apparatus is as follows.

The apparatus is supposed to be in the inoperative position. The operation commences by filling the chamber 26 of each jack 22—24, and for this purpose, the conduits 42 and 28 are connected together by the cock 43, and thus the interior of the cylinder 35 is filled with liquid. When this has been effected, the valve 39 is turned so as to connect the conduit 38 with the conduit 40 delivering the elastic fluid under pressure. This fluid fills the lower part of the cylinder 37, thus acting upon the large-diameter piston 36 and gradually raising the cylinder 35 with reference to the fixed piston 33. This movement of the cylinder 35 produces in the conduit 28, and hence in the chamber 26 of each jack, a considerable pressure, thus driving each bearing 17 of the roll 12 towards the roll 11.

At the same time, by means of the valve 51, the conduit 32 may be connected with the source of mean-pressure fluid, or pressure tank. The effect of this pressure on the cylinder 22 is negligible during the operation of the machine, but its utility will further appear.

The machine is now ready to operate.

It should be observed that the two jacks 22—24 corresponding to the two respective bearings 17 of the roll 12, are thus operated at two pressures of like value, and hence the stress on the roll 12 is counterbalanced, and this roll will remain constantly parallel with the roll 11.

When the pressure desired for each chamber 26 is attained, the valve 39 is turned in such manner as to cut off all connection between the conduits 38 and 40. During the operating, should it be desired to increase the pressure between the rolls, the valve 39 is again opened, and the cylinder 35 is further displaced.

After the machine has been stopped, all parts are returned to the inoperative position, and for this purpose the conduit 38 is connected with the pipe 41 in order to empty the cylinder 37. The pressure in the chamber 26 will at once fall, and in this case the mean pressure acting in the jack chamber 29 will preponderate; this pressure causes the jacks to return to the rear, thus separating the roll 12 from the roll 11. At the same time the piston 36 of the cylinder 35 descends by its own weight and also due to the reduction of the volume of the chamber 26.

It should be noted that the nut 21 on the screw 20 may preferably consist of a breaking piece, adapted to break before any other part of the machine, in the event of an over-pressure due to any cause, and thus the frames 10 and the gear wheels 52—53 will incur no risk of damage.

The improvements according to the invention will not prevent the use of the screw 20, should the hydraulic device fail to work, and in this case the screw is operated by a control lever. Each screw drives its bearing 17 by means of the piston 24 which is in contact with the end of the cylinder 22, since no liquid is interposed. As the nut 21 forms a breaking piece, this will afford the usual safety.

When the rolling mill is running empty, it is preferable to avoid wear of the rolls which may be pressed together by the jacks, and for this purpose, spacing members such as 46 should be mounted between the bearings 17 and 14, and the size of said members is just sufficient to maintain the rolls 11—12 at the proper distance apart, for instance a fraction of a millimeter.

Suitable devices for safety and control, such as the valves 47 and the pressure gauge 48, Fig. 2, may be mounted on the several conduits of the installation, in order to avoid all accidents and to afford a constant control of the working of the apparatus.

It should be noted that during the operating, the jacks are constantly connected with the interior of the high-pressure cylinder 35, which latter will thus absorb the shocks in the case of an excess of pressure due to an abnormal load, increasing the distance between the rolls 11 and 12 of the machine. In this manner, the present invention permits to improve the operating conditions of the machine, while affording the following advantages.

*a.* The maximum safety in operating, since there is no danger of breakage of the parts, the all abnormal pressures between the rolls being brought upon the jacks and transmitted to the elastic fluid of the pressure increasing device, which herein serves as a shock-absorber.

*b.* Great facility in the control of the pressure between the rolls, as the operator is required only to control the pressure valves, and is not obliged to exert a great force upon the levers controlling the pressure screw.

*c.* Since the pressure in the jacks is regulated for the proper treatment of the material between the rolls, and as all abnormal stresses are absorbed by the elasticity of the arrangement, the driving machine will not be obliged to support the abrupt over-pressures usually occurring with the rigid device hitherto in use.

*d.* The screw can be operated by hand as usual, without any change in the apparatus, the safety being assured by the breaking nuts.

We claim:

1. In a rolling mill for rubber having a frame supporting cooperating rolls, a pair of movable bearings for one of the rolls, a cylinder attached to each of these bearings, a piston fixedly attached to the frame and penetrating in each cylinder and forming at one extremity of the cylinder a principal chamber of the same section as the cylinder, a hydro-pneumatic device under the influence of a compressed elastic fluid for maintaining a liquid under pressure in said principal chamber.

2. In a rolling mill for rubber having a frame supporting cooperating rolls, a pair of movable bearings for one of the rolls, a cylinder attached to each of these bearings, a piston fixedly attached to the frame and penetrating in each cylinder and forming in one extremity of the cylinder a principal chamber of the same section as the cylinder, a hydro-pneumatic device under the influence of a compressed elastic fluid for maintaining a liquid under pressure in said principal chamber, an annular shoulder at the rear portion of the cylinder cooperating with a region of reduced diameter of the piston and forming at the rear of the principal chamber an auxiliary chamber of smaller section, and means for maintaining a fluid under constant pressure in said auxiliary chamber.

JACQUES SÉE.
LÉON HUOT.